US011720279B2

(12) United States Patent
Blagodurov

(10) Patent No.: US 11,720,279 B2
(45) Date of Patent: Aug. 8, 2023

(54) APPARATUS AND METHODS FOR MANAGING PACKET TRANSFER ACROSS A MEMORY FABRIC PHYSICAL LAYER INTERFACE

(71) Applicant: Advanced Micro Devices, Inc., Santa Clara, CA (US)

(72) Inventor: Sergey Blagodurov, Seattle, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 25 days.

(21) Appl. No.: 16/701,794

(22) Filed: Dec. 3, 2019

(65) Prior Publication Data

US 2021/0165606 A1 Jun. 3, 2021

(51) Int. Cl.
*G06F 3/06* (2006.01)
*G06F 13/42* (2006.01)

(52) U.S. Cl.
CPC ............ *G06F 3/0659* (2013.01); *G06F 3/061* (2013.01); *G06F 3/0673* (2013.01); *G06F 13/4221* (2013.01); *G06F 2213/0026* (2013.01)

(58) Field of Classification Search
CPC ...... G06F 3/0659; G06F 3/061; G06F 3/0673; G06F 13/4221; G06F 2213/0026
USPC ........................................................ 711/154
See application file for complete search history.

(56) References Cited

U.S. PATENT DOCUMENTS

| 6,728,839 | B1 * | 4/2004 | Marshall | ............ | G06F 12/0862 |
| | | | | | 711/137 |
| 7,979,588 | B1 | 7/2011 | Tran et al. | | |
| 10,346,342 | B1 | 7/2019 | Davis et al. | | |
| 2014/0344488 | A1 * | 11/2014 | Flynn | ....................... | G06F 13/00 |
| | | | | | 710/52 |
| 2015/0095600 | A1 * | 4/2015 | Bahnsen | ............. | G06F 11/1474 |
| | | | | | 711/163 |
| 2015/0134857 | A1 * | 5/2015 | Hahn | ....................... | G06F 3/061 |
| | | | | | 710/5 |
| 2016/0314073 | A1 | 10/2016 | Dinan et al. | | |
| 2017/0286329 | A1 * | 10/2017 | Fernando | ............. | G06F 13/1663 |
| 2019/0340155 | A1 * | 11/2019 | Brewer | ................... | G06F 9/542 |

FOREIGN PATENT DOCUMENTS

WO 2016/105863 A1 6/2016

OTHER PUBLICATIONS

European Patent Office; International Search Report and Written Opinion; International Application No. PCT/US2020/053891; dated Mar. 9, 2021.

* cited by examiner

*Primary Examiner* — Gautam Sain

(57) ABSTRACT

An apparatus and method for managing packet transfer between a memory fabric having a physical layer interface higher data rate than a data rate of a physical layer interface of another device, receives incoming packets from the memory fabric physical layer interface wherein at least some of the packets include different instruction types. The apparatus and method determine a packet type of the incoming packet received from the memory fabric physical layer interface and when the determined incoming packet type is of a type containing an atomic request, the method and apparatus prioritizes transfer of the incoming packet with the atomic request over other packet types of incoming packets, to memory access logic that accesses local memory within an apparatus.

19 Claims, 5 Drawing Sheets

APPARATUS AND METHODS FOR MANAGING PACKET TRANSFER ACROSS A MEMORY FABRIC PHYSICAL LAYER INTERFACE

GOVERNMENT LICENSE RIGHTS

This invention was made with Government support under PathForward Project with Lawrence Livermore National Security (Prime Contract No. DE-AC52-07NA27344, Subcontract No. B620717) awarded by the Department of Energy (DOE). The Government has certain rights in this invention.

BACKGROUND OF THE DISCLOSURE

Systems are being employed that use a memory-semantic fabric that extends the central processing unit (CPU) memory byte addressable load-store model to the entire system, such as a data center. The memory fabric is a type of point-to-point communication switch, also referred to as Gen-Z fabric, that is external to processor system on chips (SoC), media modules and other types of devices that allows the devices to interface with pools of external memory modules through the memory fabric in the system, such as a data center. For example, some processor SoCs include processors that include multiple processing cores that communicate via local memory access logic, such as a data fabric, with local memory such as dynamic random access memory (DRAM) or other suitable memory. The processor SoCs and other devices also need to interface with the memory fabric to use Fabric-Attached Memory (FAM) modules which can be, for example, external (e.g., non-local) memory attached directly to the data center memory fabric. In some systems, the FAM modules have memory access logic to process load and store requests but have no or few compute capabilities. In addition, the memory fabric attaches the FAM modules as an addressable part of the overall host memory. The FAM module use case enables disaggregated memory pools in cloud data centers. With FAM modules, hosts are not constrained with the memory capacity limitations of local servers. Instead, the hosts gain access to vast pools of memory not attached to any host. Hosts coordinate to partition the memory among themselves, or to share FAM modules. The Gen-Z fabric has emerged as a high performance, low latency, memory-semantic fabric that can be used to communicate to each device in the system.

A need exists for improved apparatus and methods for managing traffic across physical layer interfaces of memory fabrics that employ fabric-attached memory.

BRIEF DESCRIPTION OF THE DRAWINGS

The implementations will be more readily understood in view of the following description when accompanied by the below figures, wherein like reference numerals represent like elements, and wherein:

FIG. 6 is a flowchart illustrating a method for managing packet transfer carried out by a device coupled to a memory fabric physical layer interface in accordance with one example set forth in the disclosure.

DETAILED DESCRIPTION OF IMPLEMENTATIONS

Figure 1:
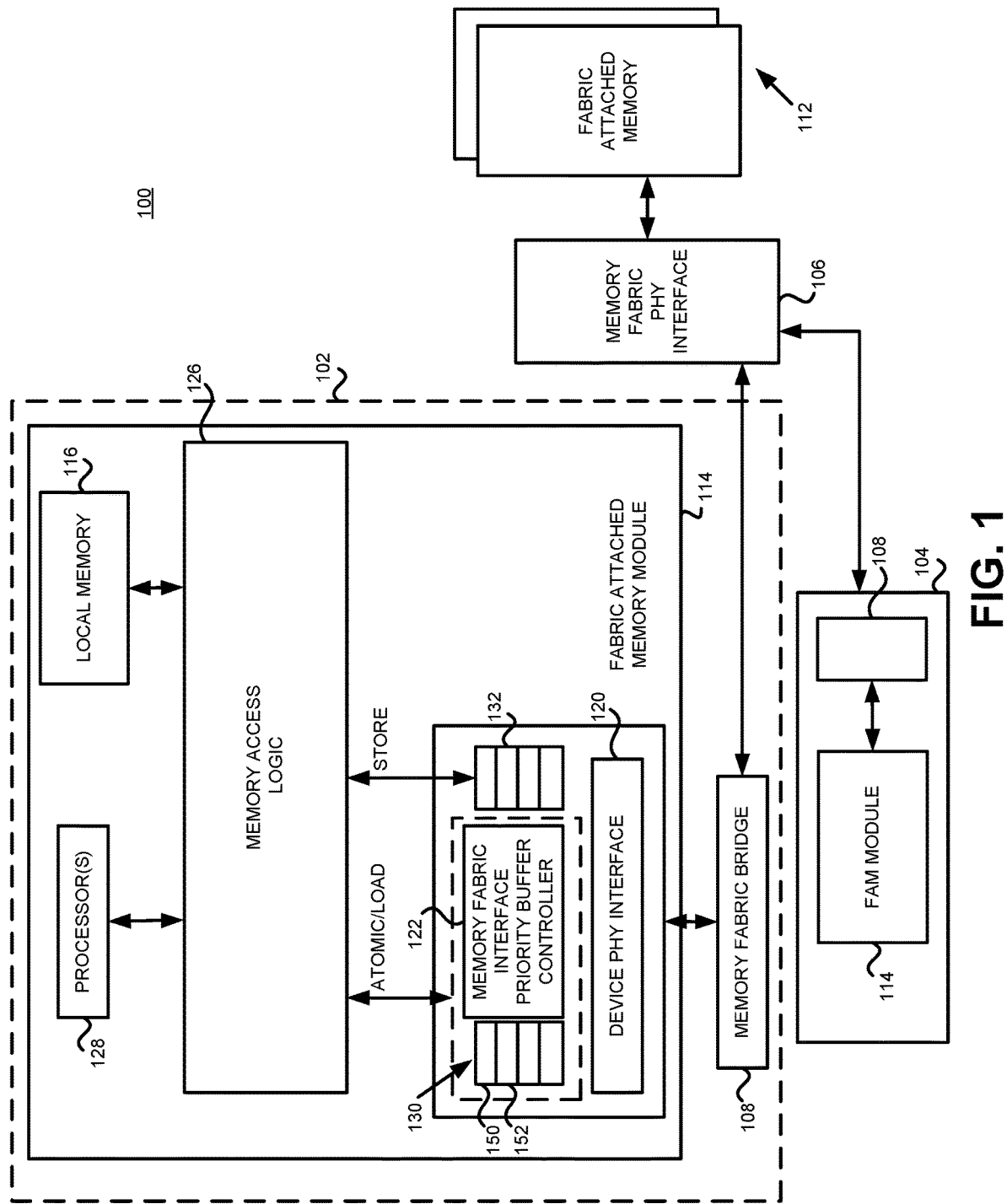
FIG. 1 is a block diagram illustrating a system that employs an apparatus for managing packet transfer on a cross-physical layer interface with a memory fabric in accordance with one example set forth in the disclosure.

A traffic bottleneck can occur with memory fabrics. The physical layer interface of the memory fabric, also referred to as the memory fabric physical layer (PHY) interface, has a higher performance operation than the physical layer interfaces associated with the system on-chips (e.g., host SoCs) or other devices that connect to the memory fabric PHY interface. For example, the signaling standard to be used for the memory fabric to enable access to FAM and messaging over the memory fabric can be on the order of 56 GT/s compared to 16 or 32 GT/s using a peripheral component interconnect, such as a PCIe interface, on the SoCs. In addition, the link widths for the memory fabric are also designed to be much larger. Some current processor SoC devices that interface with PCI-e buses use first in first out (FIFO) buffers to queue packet traffic, however, the difference in data rates and link widths on the cross-PHY interface, such as the PCI-e physical layer (PHY) interface to the memory fabric PHY interface, is still a potential bottleneck for packet traffic.

In some implementations, an apparatus serves as an interface to manage traffic priority on a junction between multiple physical layer interfaces, such as between a PCIe PHY interface and a native memory fabric PHY interface, such as a Gen-Z 802.3 type memory fabric interface. In some implementations, the apparatus provides a hardware assisted automated prioritization of packet traffic on the cross-PHY interface for data center workloads. In some implementations, the apparatus offloads cross-PHY interface optimization from a host CPU in a data center or other system employing a memory fabric physical layer interface.

In certain implementations, an apparatus and method for managing packet transfer between a memory fabric having a physical layer interface higher data rate than a data rate of a physical layer interface of another device, receives incoming packets from the memory fabric physical layer interface wherein at least some of the packets include different instruction types. The apparatus and method determine a packet type of the incoming packet received from the memory fabric physical layer interface and when the determined incoming packet type is of a type containing an atomic request, the method and apparatus prioritizes transfer of the incoming packet with the atomic request over other packet types of incoming packets, to memory access logic that accesses local memory within an apparatus.

In some examples, the method includes queuing incoming packets determined to contain the atomic request in a first priority buffer and queuing other packet types in a second priority buffer. The method also includes prioritizing output of packets from the first priority buffer over output of packets from the second priority buffer. In certain examples, the method includes queuing incoming packets determined to contain store requests in a buffer, while providing the incoming packet with the atomic request to the memory access logic.

In some examples, the method includes accessing data, such as from one or more configuration registers, defining at least some memory regions of the local memory of the device as priority memory regions, wherein each memory region has a maximum unrestricted number of memory fabric physical layer interface accesses allowed per a time interval and maintaining a count of a number of memory accesses that have been made to a defined memory region by the memory fabric physical layer interface over the time interval. The method also includes storing read packets in the second priority buffer when the maximum allowed number of accesses is exceeded and providing the stored packets to the memory access logic from the second priority buffer in the next time interval.

In certain examples, the method includes assigning the second priority buffer to include a plurality of second priority buffers wherein each of the plurality of second priority buffers corresponds to a different defined memory region storing incoming packets of a type determined to contain a read request in respective each of the plurality of second priority buffers based on an address associated with the incoming packet.

According to some implementations, an apparatus includes one or more processors and memory access logic that is also coupled to local memory wherein the local memory is configurable as an addressable part of memory addressable through a memory fabric physical layer interface. In some implementations, a physical layer interface receives incoming packets from the memory fabric physical layer interface having a higher data rate than a data rate of the physical layer interface, at least some of the packets include different instruction types. In certain implementations, a controller determines a packet type of the incoming packets received from the memory fabric physical layer interface and when the determined incoming packet type is of a type containing an atomic request, the controller prioritizes transfer of the incoming packet with the atomic request over other packet types of incoming packets, to the memory access logic.

In certain examples, the apparatus includes a first priority buffer and a second priority buffer that has a lower priority than the first priority buffer and the controller prioritizes transfer of the incoming packet with the atomic request over other packet types of incoming packets by queuing incoming packets determined to contain the atomic request in the first priority buffer and queuing other packet types in the second priority buffer. In some examples, the controller prioritizes output of packets from the first priority buffer over output of packets from the second priority buffer.

In some examples, the apparatus includes a buffer and the controller prioritizes transfer of the incoming packet with the atomic request over other packet types of incoming packets by queuing incoming packets determined to contain store requests in the buffer, while providing the incoming packet with the atomic request to the memory access logic.

In certain examples, the apparatus includes configuration registers that store data defining at least some memory regions of the local memory as priority memory regions, wherein each memory region has a maximum unrestricted number of memory fabric physical layer interface accesses allowed per a time interval. In some implementations, the controller maintains a count of a number of memory accesses that have been made to a defined memory region by the memory fabric physical layer interface over the time interval and stores read packets in the second priority buffer when the maximum allowed number of accesses is exceeded and provide the stored packets to the memory access logic from the second priority buffer in the next time interval.

In some examples, the apparatus includes a plurality of second priority buffers wherein each of the plurality of second priority buffers corresponds to a different defined memory region. In certain examples, the controller stores incoming packets of a type determined to contain a read request in respective second priority buffers based on an address associated with the incoming packet. In certain examples, the apparatus includes a bridge circuit that allows communication of packets between the physical layer interface and the memory fabric physical layer interface.

According to some implementations, an apparatus includes local memory and memory access logic, wherein the local memory is configurable as an addressable part of memory addressable through a memory fabric physical layer interface. In certain implementations, a physical layer interface receives incoming packets from the memory fabric physical layer interface having a higher data rate than a data rate of the physical layer interface, at least some of the packets including different instruction types. In some implementations, the apparatus includes an incoming packet buffer structure that includes a hierarchical ordered priority buffer structure that includes at least a first priority buffer, and a second priority buffer that has a lower priority than the first priority buffer. In some examples, the apparatus includes a controller that determines a packet type of the incoming packets from the memory fabric physical layer interface and when the determined packet type indicates that an atomic request is in an incoming packet, the controller stores the incoming packet in the first priority buffer. When the determined packet type indicates that a load instruction is in the incoming packet, the controller stores the incoming packet in the second priority buffer and provides the stored incoming packets to the memory access logic in hierarchical order according to priority buffer order.

In certain examples, the apparatus includes a buffer and the controller queues incoming packets determined to contain store requests in the buffer, while providing the incoming packet with the atomic request to the memory access logic without buffering the atomic request type packets in a high priority buffer.

In some examples, the apparatus includes configuration registers that include data that defines at least some of memory regions of the local memory as priority memory regions, wherein each memory region has a maximum unrestricted number of memory fabric physical layer interface accesses allowed per a time interval. In certain implementations, the controller maintains a count of a number of memory accesses that have been made to a defined memory region by the memory fabric physical layer interface over the time interval and stores packets in the second priority buffer when the maximum allowed number of accesses is exceeded. In some implementations, the controller provides the stored packets from the second priority buffer to the memory access logic from the buffer in the next time interval.

In certain examples, the second priority buffer includes a plurality of second priority buffers wherein each of the plurality of second priority buffers corresponds to a different defined memory region and the controller stores incoming packets of a type determined to contain a read request in respective second priority buffers based on an address associated with the incoming packet.

According to some implementations, a system includes a memory fabric physical layer interface operative to interconnect a plurality of distributed non-volatile memories with a first device and a second device. The first and second devices may include servers, SoCs or other devices. Each of the first and second devices have a physical layer interface to receive memory access requests from each other via the memory fabric physical layer interface. In some implementations, the second device includes local memory, such as DRAM that is operatively coupled to memory access logic. The local memory is configurable as an addressable part of the distributed non-volatile memories addressable through the memory fabric physical layer interface. In certain examples, the physical layer interface receives incoming packets from the memory fabric physical layer interface that has a higher data rate than a data rate of the physical layer interface, at least some of the packets being of different instruction types. In certain examples, a controller determines a packet type of the incoming packets received from the memory fabric physical layer interface and when the determined incoming packet type is of a type containing an atomic request, the controller prioritizes transfer of the incoming packet with the atomic request over other packet types of incoming packets, to the memory access logic.

In certain examples, the second device includes a first priority buffer and a second priority buffer that has a lower priority than the first priority buffer. In some examples, the controller prioritizes transfer of the incoming packet with the atomic request over other packet types of incoming packets by queuing incoming packets determined to contain the atomic request in the first priority buffer and queuing other packet types in the second priority buffer. In some implementations, the controller is operative to prioritize output of packets from the first priority buffer over output of packets from the second priority buffer, to the memory access logic.

In some examples, the second device includes a buffer and the controller prioritizes transfer of the incoming packet with the atomic request over other packet types of incoming packets by queuing incoming packets determined to contain store requests in the buffer, while providing the incoming packet with the atomic request to the memory access logic.

In certain examples, the second device includes configuration registers that contain data that defines at least some memory regions of the local memory as priority memory regions, wherein each memory region has a maximum unrestricted number of memory fabric physical layer interface accesses allowed per a time interval. In some examples, the controller maintains a count of a number of memory accesses that have been made to a defined memory region by the memory fabric physical layer interface over the time interval and stores read packets in the second priority buffer when the maximum allowed number of accesses is exceeded and provides the stored packets to the memory access logic from the second priority buffer in the next time interval.

In some examples, the second priority buffer includes a plurality of second priority buffers wherein each of the plurality of second priority buffers corresponds to a different defined memory region. In certain examples, the controller stores incoming packets of a type determined to contain a read request in respective second priority buffers based on an address associated with the incoming packet.

FIG. 1 illustrates one example of a system 100, such as a cloud-based computing system in a data center or other system, that includes a plurality of devices 102 and 104 that are coupled to a memory fabric physical layer interface 106 each through a memory fabric bridge 108. In one example, the memory fabric physical layer interface 106 is implemented as a memory fabric switch that includes memory fabric physical layer interfaces such as a Gen-Z fabric (e.g., 802.3 PHY), or any other suitable memory fabric physical layer interface. The memory fabric physical layer interface 106 provides access to fabric-attached memory 112 such as media modules with media controllers and non-volatile memory such as DRAM, storage class memory (SCM), or other suitable memory that is part of the fabric-attached memory pool that is addressable by the devices 102 and 104. The fabric-attached memory 112 may also include graphics processing units, field programmable gate arrays with local memory, or any other suitable modules that provide addressable memory that is addressable by devices 102 and 104 as part of a system wide memory fabric. In some implementations, the local memory on devices 102 and 104 is also fabric-attached memory and is addressable and accessible by other processor-based devices in the system. In some implementations, the devices 102 and 104 are physical servers in a data center system.

In this example, device 102 is shown as including a processor system on-chip that serves as a type of fabric-attached memory module 114, in combination with a memory fabric bridge 108. However, any suitable implementation may be employed, such as, but not limited to, integrated circuits, multiple package devices having multiple SoCs, a fabric-attached memory module with no processor or with limited computing capability, a physical server or servers, or any other suitable device. It will also be recognized that the various blocks may be combined or distributed in any suitable manner. For example, the memory fabric bridge 108 in one example is an integrated circuit that is separate from the SoC and in other implementations is integrated as part of the SoC. In this example, the device 102 serves as a type of fabric-attached memory module that includes local memory 116 that is accessible by device 104 and as such, receives incoming packets from device 104 or other devices connected to the memory fabric physical layer interface 106 that use load requests, store requests and atomic requests in connection with the local memory 116.

The memory fabric bridge 108 may be any suitable bridge circuit and in one example, includes an interface to connect with the memory fabric physical layer interface 106 and another interface to connect with the physical layer interface 120. The memory fabric bridge 108 may be a separate integrated circuit or may be integrated as part of a system on-chip or be a separate package. Also, it will be recognized that many variations of the device 102 may be employed including a device incorporating multiple SoCs, individual integrated circuits, multiple packages or any other suitable configuration as desired. For example, as noted above, the device 102 may instead be configured as a media module that does not include processors such as processor 128 or other computing logic but instead may include, for example, a media controller which serves as a memory controller for local memory 116 so that external devices such as other fabric-attached memories or other processor system on-chip devices can access the local memory 116 as part of a fabric addressable memory.

In this example, the fabric-attached memory module 114 includes a physical layer interface 120 in communication with a controller 122 that serves as a memory fabric interface priority buffer controller. In certain examples the controller 122 is implemented as an integrated circuit such as a field programmable gate array (FPGA) but any suitable structure may be used including an application specific integrated circuit (ASIC), a programmed processor executing executable instructions that are stored in memory, state machines or any suitable structure. The controller 122 provides packets that include atomic requests, load requests and store requests to memory access logic 126.

The memory access logic 126 includes, in one example, one or more memory controllers that process the memory access requests provided by the controller 122 to access the local memory 116. The controller 122 both serves the data from local memory 116 in response to the requests coming from a remote compute unit on the fabric (e.g., associated with memory fabric physical layer interface 106, or fabric-attached memory 112, or remote device 104 (e.g., remote node) connected to the fabric and also serves data from fabric attached memory 112 in response to the requests issued to the fabric from the local compute unit such as processor 128. In this example, the fabric-attached memory module 114 also includes one or more processors 128 that also uses the local memory 116 through the memory access logic 126 as well as the fabric-attached memory 112 through the memory fabric physical layer interface 106. In certain implementations, the local memory 116 includes non-volatile random-access memory (RAM) such as, but not limited to, DDR4 based dynamic random-access memory and/or non-volatile dual in line memory modules (NVDIMM). However, any suitable memory may be used. The local memory 116 is configurable as an addressable part of the distributed non-volatile memories addressable through the memory fabric physical layer interface 106. As such, the local memory 116 serves as a type of fabric-attached memory when it is accessed by a remote compute unit on the fabric.

The memory fabric physical layer interface 106 interconnects a plurality of other distributed non-volatile memories which are fabric-attached memory modules that in one example, are media modules configured as fabric-attached memory that each include non-volatile random access memory (RAM) such as, but not limited to, DDR4 based dynamic random access memory, non-volatile dual in line memory modules (NVDIMM), NAND flash memory, storage class memory (SCM) or any other suitable memory.

The physical layer interface 120 receives incoming packets from the memory fabric physical layer interface 106 that has a higher data rate than a data rate of the physical layer interface 120. The packets received by the physical layer interface include packets of different instruction types. In this example, packets can be of a type having an atomic request, a load request and/or a store request. Other packet types are also contemplated. The physical layer interface 120 in this example will be described as a PCI Express (PCIe) physical layer interface, however any suitable physical layer interface may be employed. In this example, the memory fabric physical layer interface 106 has a higher data rate than a data rate of the physical layer interface 120. In one example, the data rates are higher due to the rate of data transfer and/or the number of data link widths used for the interconnects. The physical layer interface 120 receives memory access requests from the device 104 in this example. Likewise, the device 102 may also make memory access requests to device 104.

The fabric-attached memory module 114 employs an incoming packet buffer structure 130 that includes a hierarchical ordered priority buffer structure that includes different priority buffers, such as FIFO buffers or other suitable buffer structure, wherein certain of the buffers have a higher priority over others. The fabric-attached memory module 114 in this example also includes a buffer 132, such as a local buffer, that queues incoming packets that are determined to contain store requests. The buffer 132 is considered a lower priority buffer in that writes are not considered critical in many cases for applications that are being executed. As such, the controller 122 saves store requests (e.g., writes) into buffer 132. Physical layer interface 120 has a smaller data rate and smaller link width than memory fabric bridge 108, so the buffering occurs before the physical layer interface 120 and after memory fabric bridge 108. Packets with atomic requests and load requests are given higher priority. Write data is held in the buffer 132, for example, for longer periods of time during while many other instructions can complete. If an error occurs when the write is finally performed, the controller 122 generates an asynchronous retry operation. In some examples, the incoming packet buffer structure 130 and buffer 132 is included in the integrated circuit that includes the controller 122.

In some implementations, the memory access logic 126 may be implemented as a local data fabric that includes various other components for interfacing with the CPU, its caches and the local memory 116. For example, the memory access logic 126 connects to one or more memory controllers such as DRAM controllers to access the local memory 116. Although some of the components are not illustrated, any suitable memory access logic can be employed such as any suitable memory controller configuration or any other suitable logic that processes memory requests such as atomic requests, load requests and store requests.

Figure 2:
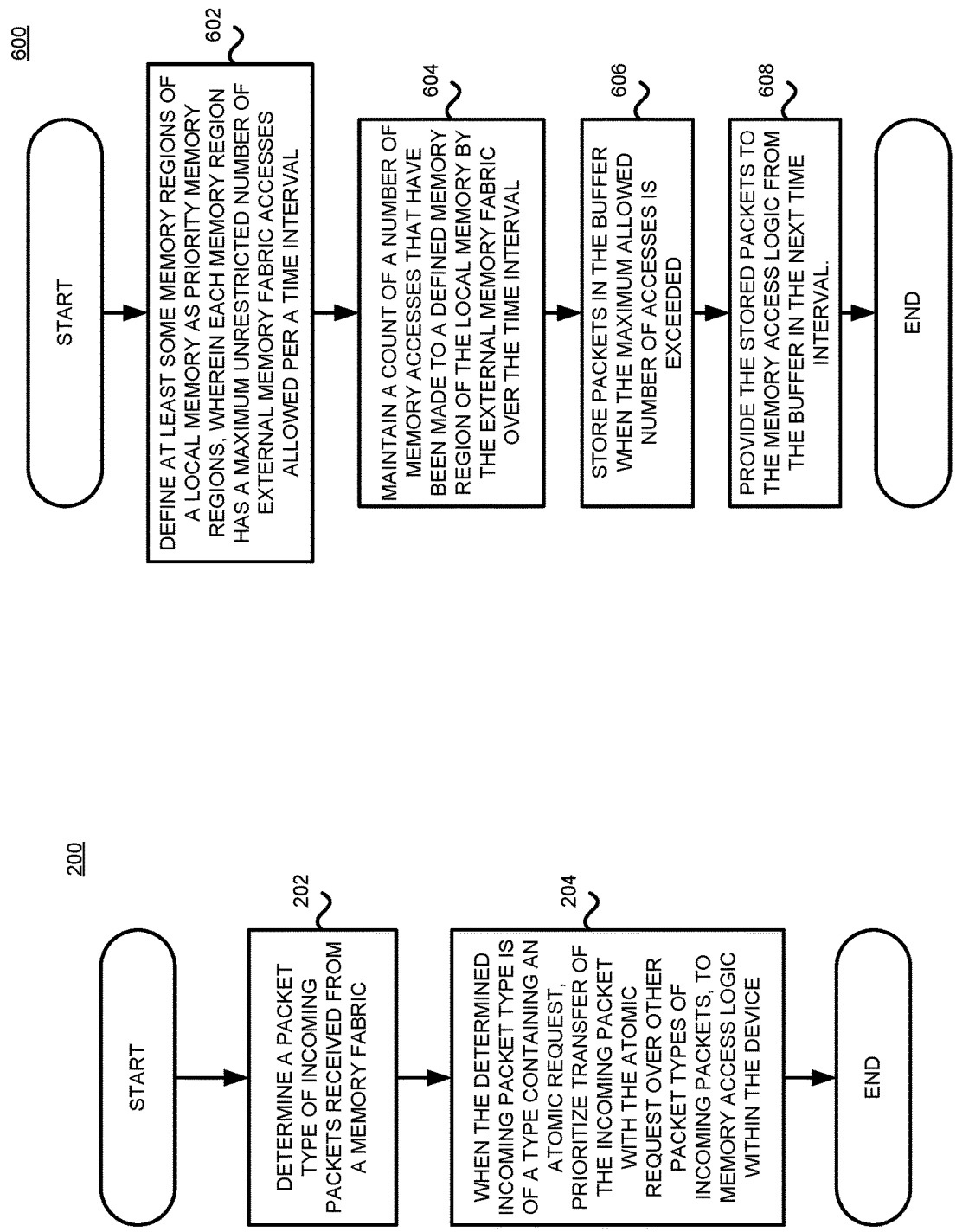
FIG. 2 is a flowchart illustrating a method for managing packet transfer carried out by a device coupled to a memory fabric physical layer interface in accordance with one example set forth in the disclosure.

FIG. 2 is a flowchart illustrating one example of a method 200 for managing packet transfer carried out by the device 102. In this example, the operations are carried out by the controller 122. In one implementation, the controller 122 is implemented as a field programmable gate array (FPGA) that operates as described herein. However, it will be recognized that any suitable logic may be employed. The controller 122 receives incoming packets from the memory fabric physical layer interface 106 through the physical layer interface 120. As shown in block 202, the method includes determining a packet type of the incoming packets received from the memory fabric physical layer interface 106. In one implementation, the packets include packet identification data within the packet that identifies the packet as one having atomic requests, load requests, store requests, or any suitable combination thereof. Other packet types are also contemplated. In other examples, the packets may include indexes or other data representing the packet type. In other implementations, the controller 122 determines the packet type based on the data that is within the packet itself, is appended to the packet, or otherwise determined to be associated with the packet. In one implementation, the controller 122 evaluates the packet for a packet type identifier which may be one or more bits and determines from the packet identifier the packet type of each incoming packet.

As shown in block 204, when the determined incoming packet type is of a type containing an atomic request, the method includes prioritizing transfer of the incoming packet with the atomic request over other packet types of incoming requests, so that atomic requests are given the highest priority. For example, if the incoming packet is determined to be an atomic request, the packet is passed directly to the memory access logic 126 for processing without buffering if the memory access logic has enough bandwidth to handle the packet. In another example, the controller 122 queues incoming atomic request type packets in a higher priority buffer which are read out and provided to the memory access logic 126 before other packet types are provided to the memory access logic. The packets are eventually provided to the memory access logic 126, but the priority buffering is happening before traffic enters the physical layer interface 120 and after it leaves the memory fabric bridge 108.

For example, and referring also to FIG. 1, in some implementations, prioritizing transfer of the incoming packet with the atomic request includes queuing incoming packets determined to contain the atomic request in a high priority buffer 150 and queuing other packet types in a medium priority buffer 152 wherein the first priority buffer has a higher priority than the second priority buffer. The controller 122 prioritizes output of the packets from the high priority buffer 150 over output of packets from the medium priority buffer 152. In an example, this is done through a multiplexing operation. In some implementations, prioritizing transfer of the incoming packets with the atomic requests over other packet types of incoming packets includes queueing incoming packets determined to contain store requests in buffer 132, while providing the incoming packet with the atomic request to the memory access logic 126 without requiring storage of the atomic request in the high priority buffer 150. As noted above, in some implementations, this occurs when the memory access logic 126 has bandwidth capacity to accept incoming packets without further queuing.

Figure 3:
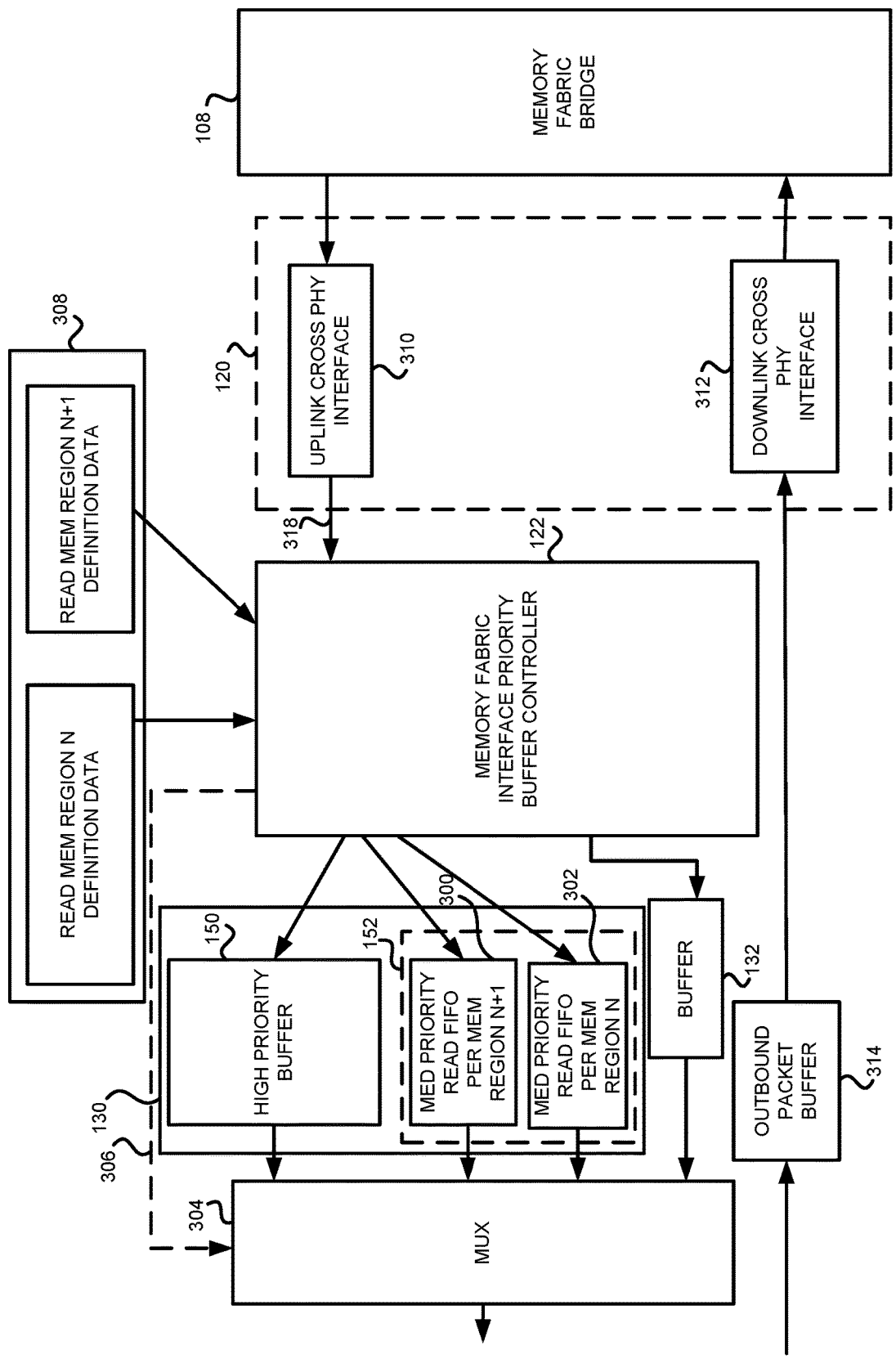
FIG. 3 is a block diagram illustrating an apparatus for managing packet transfer in accordance with one example set forth in the disclosure.

The diagram of FIG. 3 is an example, which should not unduly limit the scope of the claims. One of ordinary skill in the art would recognize many variations, alternatives and modifications. Although the above has been shown using a selected group of processes for the method, there can be many alternatives, modifications, and variations. For example, some the processes may be expanded and/or combined. Other processes may be inserted to those noted above. Depending upon the embodiment, the sequence of processes may be interchanged with others replaced.

FIG. 3 is a block diagram illustrating another example of a device for managing packet transfer with a memory fabric physical layer interface in accordance with one example. In this example, the incoming packet buffer structure 130 is illustrated as having multiple medium priority buffers 300 and 302 each corresponding to different defined memory regions within local memory 116. The high priority buffer 150 serves as a higher priority buffer that stores atomic requests and a multiplexor 304 (MUX) prioritizes transfer of packets from high priority buffer 150 over read requests that are stored in medium priority buffers 300 and 302. The controller 122 may control the multiplexing operation of multiplexor 304 as shown by dashed arrow 306 or the multiplexor 304 may include suitable logic to output data in high priority buffer entries before entries from lower priority buffers. The multiplexor 304 selects from the higher priority buffer that has entries and provides the packets from those entries in a hierarchical priority manner. The multiplexor 304 is considered to be part of the controller 122 in certain examples.

In one example, the local memory 116 is divided into memory regions by the controller 122, the processor 128 under control of an operating system or driver executing on the processor 128, or any other suitable mechanism. In one example, the controller 122 includes configuration registers 308 that contain data that defines a starting address and size of various memory regions in local memory 116. In other examples, data representing a starting address and ending address are stored in the configuration registers 308, or any other suitable data that defines one or more memory regions of local memory 116. The controller 122 determines the various memory regions based on the data from the configuration registers and organizes the medium priority buffer 152 into a plurality of medium priority buffers 300 and 302 each buffer corresponding to a memory region defined by the configuration registers 308.

In this example, the physical layer interface 120 includes an uplink cross-physical layer interface 310 and a downlink cross-physical layer cross-interface 312. An outbound packet buffer 314 allows the memory access logic 126 to output outbound packets to the memory fabric bridge 108 and thus, to the memory fabric physical layer interface (e.g., switch) 106. The incoming packets shown as 318 are handled by the controllers as described herein. In certain implementations the throughput may be reversed so the downlink structure has similar buffering for the outbound packets as shown for the inbound traffic.

Figure 4:
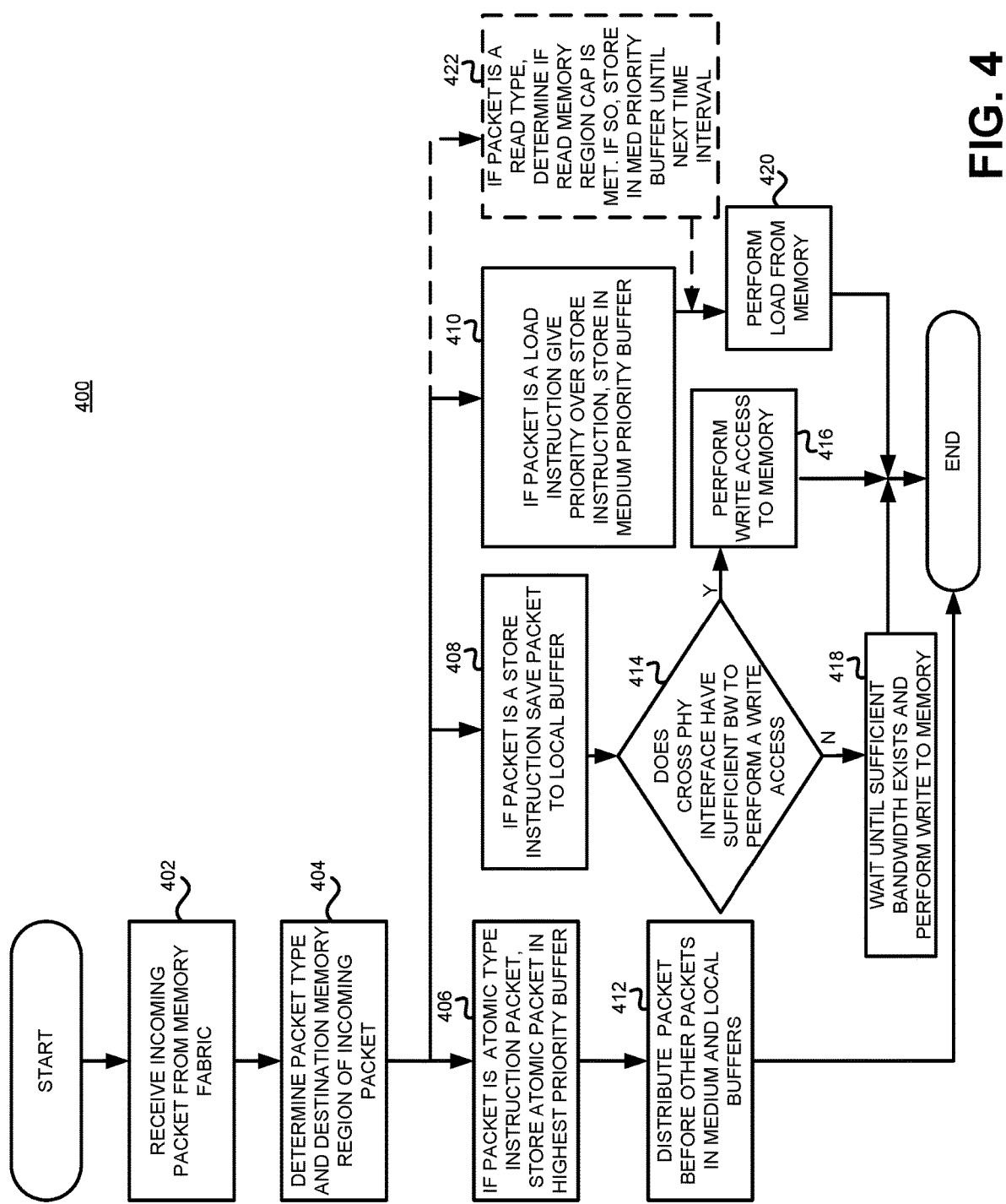
FIG. 4 is a flowchart illustrating a method for managing packet transfer carried out by a device coupled to a memory fabric physical layer interface in accordance with one example set forth in the disclosure.

FIG. 4 is a flowchart illustrating one example of a method 400 for managing packet transfer in accordance with one embodiment. As previously described, the controller 122 decides when the packet traffic that enters the fabric-attached memory module 114 from the memory fabric physical layer interface 106 is allowed to enter the memory access logic 126, such as a data fabric of an SoC. In this example, the priority level is chosen based on the packet type entering the SoC from the memory fabric physical layer interface and the destination memory region. As shown in block 402, the controller 122 receives incoming packets from the memory fabric physical layer interface 106 through the memory fabric bridge 108. As shown in block 404, the controller 122 determines the packet type and destination memory region of the incoming packet. In one example, this is done by evaluating the data within a packet wherein the data identifies the packet type and a destination memory region within the local memory 116 by a destination address or other suitable information. As shown in block 406, if the packet type is an atomic type instruction packet, the controller 122 stores the atomic packet in the higher priority buffer, in this example, high priority buffer 150. The controller assigns medium priority buffers to include a plurality of priority buffers wherein each of the plurality of priority buffers corresponds to a different defined memory region. The controller stores incoming packets of a type determined to contain a read request into a corresponding region priority buffer based on a memory address associated with the incoming packet.

However, if the packet is a store request packet such as a write request as shown in block 408, the controller saves the packet to a local buffer such as buffer 132. As shown in block 410, if the packet is determined to be a load request, meaning a load instruction or read request, the controller 122 gives priority to the load packet over a store instruction but less of a priority than an atomic request and stores the packet in medium priority buffer 152, whereas the high priority buffer 150 is a higher priority buffer and the buffer 132 is considered a low priority buffer.

Referring to FIG. 3, the controller 122 determines which of the medium priority buffers 300 and 302 to store the incoming packet in based on the destination address of the packet. In one example, where the incoming packet has a destination address within the address region identified by the data representing the data region defined by the configuration registers 308, the controller places the incoming packet in the appropriate medium priority buffer for the incoming load request. In one example, the high priority buffer 150 and the medium priority buffer 152 are first in first out (FIFO) buffers, however any suitable buffer mechanism may be employed. As such, the controller 122 accesses data defining memory regions, such as the data stored in the configuration registers 308, or other memory location. In some implementations, an operating system and/or driver executing on the one or more processors can designate the memory regions through the configuration registers that are exposed by the controller. In other implementations, the controller includes a number of predetermined designated memory regions as provided by firmware or microcode. However, any suitable implementation may be employed.

Referring to FIG. 4, as shown in block 412, the method includes distributing packets in the high priority buffer 150 before other packets in medium priority buffers 300 and 302 and buffer 132. In one example, this is performed by the multiplexor 304 which outputs packets from buffer entries according to priority. As shown in block 414, where the packet is a store request, the method includes determining whether the cross-physical layer interface has sufficient bandwidth to pass a write access. Stated another way, the controller 122 determines whether the physical layer interface 120 (that has smaller data rate and smaller link width than the memory fabric bridge 108) can pass the write packet through it. For example, the physical layer interface 120 starts rejecting packets when the MUX 304 saturates the physical layer interface 120 receiver. When this occurs, buffering read requests as described above is started. If there is sufficient bandwidth to pass the write access, as shown in block 416, the method includes passing the write access to local memory 116. If there is not sufficient bandwidth to pass a write access, the method includes waiting until sufficient bandwidth exists and then passing the write operation to memory according to the write request packet as shown in block 418.

Referring to the medium priority buffers 300 and 302, as shown in block 420, if the incoming packet is a load request (e.g., read request) and there are no other high priority incoming packets in the high priority buffer 150, the method includes performing the load operation from memory by outputting the packet from the appropriate medium priority buffers 300, 302 to the memory access logic 126. The method continues for incoming packets.

As shown by block 422, if a capping quality of service mechanism is employed, the method includes, if the packet is a read type packet, determining if the corresponding memory region in local memory 116 having the address of the packet is capped during the time interval. For example, if too many accesses to that memory region in local memory 116 have occurred within the time interval, the controller 122 stores the incoming packet in the medium priority buffer 152 until a next time interval occurs.

Figure 5:
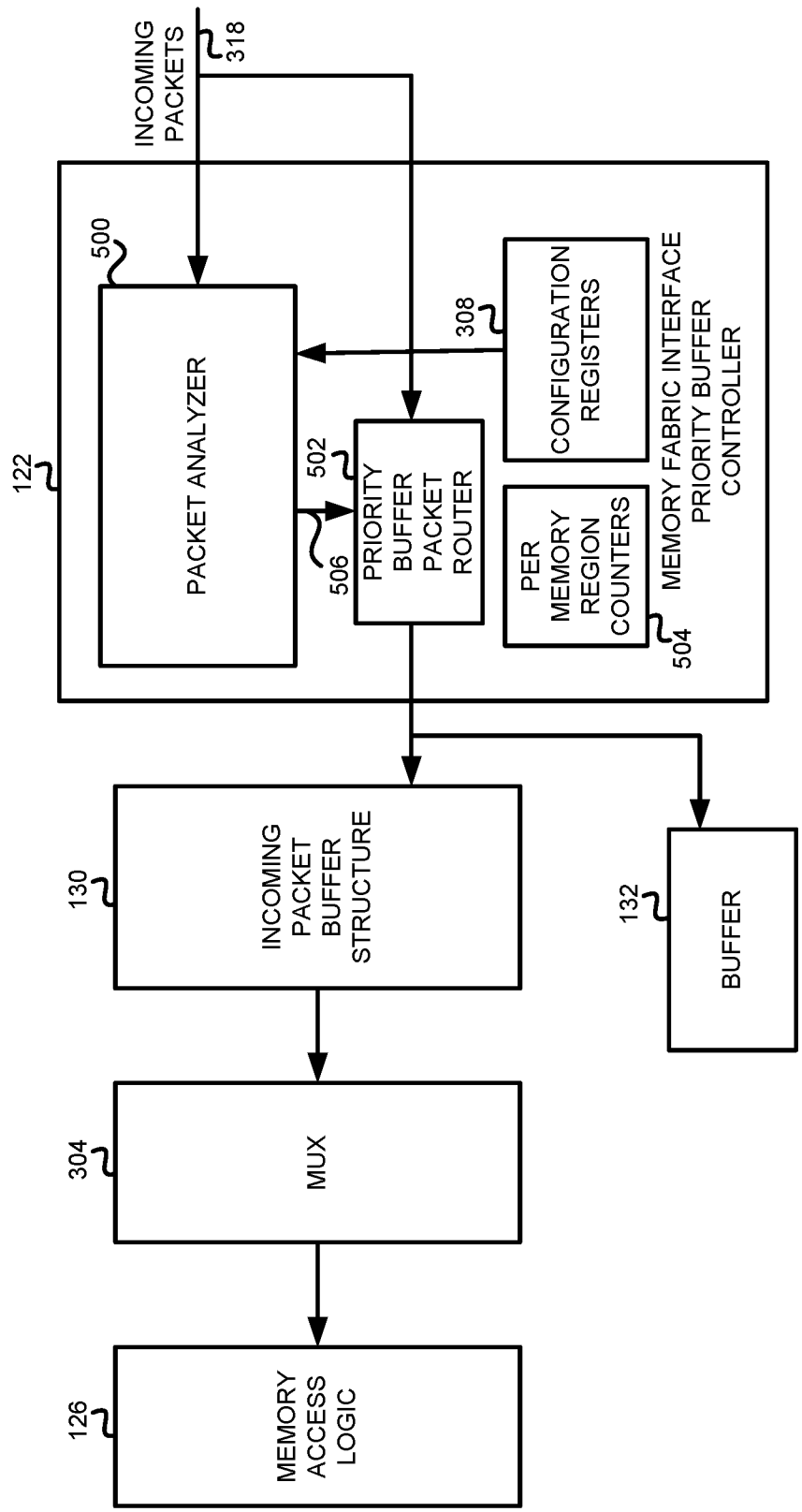
FIG. 5 is a block diagram illustrating an apparatus for managing packet transfer in accordance with one example set forth in the disclosure.

FIG. 5 is a block diagram illustrating another example of a device for managing packet transfer with a memory fabric physical layer interface. In this example, the controller 122 includes a packet analyzer 500, a priority buffer packet router 502, and per-memory region counters 504. The packet analyzer 500 analyzes incoming packets to determine the packet type by, for example, scanning the content of the packet and interpreting the content, or evaluating packet type data within the packet to determine if the packet is a packet for an atomic request (e.g., atomic instruction execution), a load request (e.g., read instruction), or a store request (e.g., write instruction) and outputs the packet 506 to the priority buffer packet router 502 which places the packet in the appropriate prioritized buffer. The packet 506 may be routed directly to the appropriate buffer or include a routing identifier to indicate which priority buffer to place the packet in. As noted, the configuration registers 308 define at least some memory regions of the local memory 116 of the device as priority memory regions wherein each memory region has a maximum unrestricted number of memory fabric physical layer interface accesses allowed per a time interval. For example, the controller 122 allows to register some memory regions in local memory 116 as priority memory regions via the configuration registers, for example a model-specific register (MSR).

Among the registered memory regions, and all other memory fabric mapped memory, the controller 122 employs a type of quality of service capping technique. For example, each registered memory region has a maximum unrestricted number of fabric accesses that the memory region can receive per time interval, and the sum of the caps for the entire local memory 116 mapped into the memory fabric space does not exceed the available cross-PHY capacity (e.g., limited by PCIe channel width and data rates). Because the assigned caps do not exceed the available channel capacity (the excess packets will wait until the next time interval), a level of isolation from other memory regions in the fabric is high. A larger memory region receives a larger cap.

The per-memory region counters 504 are incremented for each memory access for each region and the controller 122 compares a current count value to a threshold value corresponding to the maximum unrestricted number of fabric accesses per region. The threshold value may be stored as part of the configuration register information or other mechanism. As such, the controller 122 maintains a count of a number of memory accesses that have been made to a defined memory region by the memory fabric physical layer interface over the time interval. The controller 122 stores read packets (load packets) in the medium priority buffer 152 when the maximum allowed number of accesses is exceeded during the defined time interval. The controller stores the packets in the region buffer every time when the MUX has higher priority packets to issue (like atomics). The cap determines whether to issue packets from the given region buffer to the MUX. If the cap is reached, issuing to the MUX temporarily stops until the next time interval begins (which is a configurable controller parameter). Stated another way, the registered memory regions that are defined by the configuration registers are the memory regions in local memory 116. Every memory region thus registered has a buffer. In this example medium priority buffers 300 and 302 are associated with the defined memory regions and each stores accesses to that memory region in local memory 116 from the fabric. The cap determines whether to issue accesses from the given buffer to the MUX so the memory access can eventually find its way to its memory region in local memory 116. If the cap is reached, issuing to the MUX temporarily stops until the next time interval begins.

The stored packets are provided to the memory access logic 126 from the medium priority buffer 152 in the next time interval. In this example, the controller 122 stores incoming packets of the type determined to contain a read request in each of the plurality of medium priority buffers 300 and 302 based on an address associated with the incoming packet and also tracks the number of memory accesses in the memory regions to cap the number of accesses that occurs in a particular memory region.

FIG. 6 is a flowchart illustrating one example of a method 600 for managing packets in accordance with one example. As shown in block 602, the method includes defining at least some memory regions of the local memory as priority memory regions wherein each memory region has a maximum unrestricted number of memory fabric physical layer interface accesses allowed per time interval. As shown in block 604, the method includes maintaining a count of a number of memory accesses that have been made through a defined memory region of the local memory by the memory fabric physical layer interface over the time interval. As shown in block 606, the method includes storing packets in the priority buffer when the maximum allowed number of accesses is exceeded and as shown in block 608, the method includes providing the stored packets to the memory access logic from the buffer in the next time interval.

Among other technical advantages, the employment of the controller and buffer hierarchy reduces latency of access to a local memory that is addressable as part of a memory fabric and improves energy efficiency. Also, where the fabric-attached memory module includes one or more processors, the controller offloads packet management from the one or more processors thus increasing the speed of processor operations. Other advantages will be recognized by those of ordinary skill in the art.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

What is claimed is:

1. A method for managing packet transfer carried out by a device comprising:
   receiving incoming packets for local memory within the device that is configured as fabric attached memory and is addressable by other devices through a memory fabric physical layer interface, at least some of the packets comprising different instruction types, the memory fabric physical layer interface having a higher data rate than a data rate of a physical layer interface of the device;
   determining, by a controller of the device, a packet type of the incoming packets received from the memory fabric physical layer interface via the physical layer interface; and
   when the determined incoming packet type from the memory fabric physical layer interface is of a type containing an atomic request, queuing incoming packets determined to contain the atomic request in a first priority buffer, queuing incoming packets determined to contain load requests in a second priority buffer having a lower priority than the first priority buffer, queueing incoming packets determined to contain store requests in a third priority buffer having a lower priority than the second priority buffer and prioritizing, by the controller, transfer of the incoming packet with the atomic request over packets in the second and third priority buffers, to memory access logic that accesses the local memory within the device.

2. The method of claim 1, wherein the prioritizing transfer of the incoming packet with the atomic request comprises:
   prioritizing output of packets from the second priority buffer over output of packets from the third priority buffer containing the packets comprising the store requests.

3. The method of claim 2, further comprising:
   accessing data defining at least a plurality of memory regions of a local memory of the device as priority memory regions, wherein each memory region has a maximum unrestricted number of memory fabric physical layer interface accesses allowed per a time interval;
   maintaining a count of a number of memory accesses that have been made to a defined memory region by the memory fabric physical layer interface over the time interval;
   storing read packets in the second priority buffer when the maximum allowed number of accesses is exceeded; and
   providing the stored packets to the memory access logic from the second priority buffer in a next time interval.

4. The method of claim 1, wherein the prioritizing transfer of the incoming packet with the atomic request comprises queuing incoming packets determined to contain a store request in the third priority buffer, while providing the incoming packet with the atomic request to the memory access logic without storing the incoming packet with the atomic request in the first priority buffer.

5. The method of claim 1, further comprising:
   assigning the second priority buffer to include a plurality of second priority buffers, wherein each of the plurality of second priority buffers corresponds to a different defined memory region; and
   storing incoming packets of a type determined to contain a read request in respective second priority buffers corresponding to the different defined memory regions based on an address associated with the incoming packet.

6. An apparatus, comprising:
one or more processors;
a memory access logic operatively coupled to the one or more processors;
local memory, within the apparatus, operatively coupled to the memory access logic and configurable as an addressable part of memory addressable as fabric attached memory and is addressable by other devices through a memory fabric physical layer interface;
a physical layer interface, operatively coupled to the memory access logic, and operative to receive incoming packets for the local memory that is configured as fabric attached memory, from the memory fabric physical layer interface having a higher data rate than a data rate of the physical layer interface, at least some of the packets comprising different instruction types;
a controller operatively coupled to the physical layer interface and configured to:
determine a packet type of the incoming packets received from the memory fabric physical layer interface via the physical layer interface; and
when the determined incoming packet type is of a type containing an atomic request, queuing incoming packets determined to contain the atomic request in a first priority buffer, queuing incoming packets determined to contain load requests in a second priority buffer having a lower priority than the first priority buffer, queueing incoming packets determined to contain store requests in a third priority buffer having a lower priority than the second priority buffer and prioritize transfer of the incoming packet with the atomic request over packets in the second and third priority buffers, to the memory access logic.

7. The apparatus of claim 6, comprising:
wherein the controller is further configured to prioritize output of packets from the first priority buffer over output of packets from the second priority buffer and prioritize output of packets from the second priority buffer over output from the third priority buffer.

8. The apparatus of claim 7, further comprising:
configuration registers that are configured to include data that defines at least a plurality of memory regions of the local memory of the device as priority memory regions, wherein each memory region has a maximum unrestricted number of memory fabric physical layer interface accesses allowed per a time interval; and
wherein the controller is further configured to:
maintain a count of a number of memory accesses that have been made to a defined memory region by the memory fabric physical layer interface over the time interval;
store read packets in the second priority buffer when the maximum allowed number of accesses is exceeded; and
provide the stored packets to the memory access logic from the second priority buffer in a next time interval.

9. The apparatus of claim 8, wherein:
the second priority buffer comprises a plurality of second priority buffers, wherein each of the plurality of second priority buffers corresponds to a different defined memory region; and
the controller is further configured to store incoming packets of a type determined to contain a read request in respective second priority buffers that correspond to the different defined memory regions based on an address associated with the incoming packet.

10. The apparatus of claim 6, further comprising:
wherein the controller is further configured to queue incoming packets determined to contain store requests in the buffer, while providing the incoming packet with the atomic request to the memory access logic.

11. The apparatus of claim 6, further comprising a memory fabric bridge circuit operatively coupled to the controller and to the memory fabric physical layer interface, and operative to communicate packets between the physical layer interface and the memory fabric physical layer interface.

12. An apparatus, comprising:
local memory operatively coupled to a memory access logic and configurable as an addressable part of memory addressable by other devices through a memory fabric physical layer interface;
a physical layer interface operative to receive incoming packets from the memory fabric physical layer interface having a higher data rate than a data rate of the physical layer interface, at least some of the packets comprising different instruction types;
an incoming packet buffer structure comprising a hierarchical ordered priority buffer structure that comprises at least a first priority buffer, a second priority buffer that has a lower priority than the first priority buffer and a third priority buffer that has a lower priority than the second priority buffer;
a controller operatively coupled to the physical layer interface and to the incoming packet buffer structure;
wherein the controller is configured to:
determine a packet type of the incoming packets from the memory fabric physical layer interface;
when the determined packet type indicates that an atomic request is in an incoming packet, store the incoming packet in the first priority buffer,
when the determined packet type indicates that a load instruction is in the incoming packet, store the incoming packet in the second priority buffer;
when the determined packet type indicates that a store instruction is in the incoming packet, store the incoming packet in the third priority buffer; and
provide the stored incoming packets to the memory access logic, in hierarchical order according to priority buffer order.

13. The apparatus of claim 12, further comprising:
wherein the controller is further configured to queue incoming packets determined to contain store requests in the store buffer, while providing the incoming packet with the atomic request to the memory access logic.

14. The apparatus of claim 13, further comprising:
configuration registers that are configured to include data that defines at least a plurality of memory regions of a local memory of the device as priority memory regions, wherein each memory region has a maximum unrestricted number of memory fabric physical layer interface accesses allowed per a time interval; and
wherein the controller is further configured to:
maintain a count of a number of memory accesses that have been made to a defined memory region by the memory fabric physical layer interface over the time interval;
store packets in the second priority buffer when the maximum allowed number of accesses is exceeded; and provide the stored packets from the second priority buffer to the memory access logic from the buffer in a next time interval.

15. The apparatus of claim 12, wherein:
the second priority buffer comprises a plurality of second priority buffers, wherein each of the plurality of second priority buffers corresponds to a different defined memory region; and
the controller is further configured to store incoming packets of a type determined to contain a read request in respective second priority buffers that correspond to different defined memory regions based on an address associated with the incoming packet.

16. A system, comprising:
a memory fabric operative to interconnect a plurality of distributed non-volatile memories;
a first device operatively coupled to the memory fabric; and
a second device operatively coupled to the memory fabric, the first and second devices having a physical layer interface to receive memory access requests from each other via the memory fabric, the second device comprising:
  local memory operatively coupled to a memory access logic of the second device, the local memory configurable as an addressable part of the distributed non-volatile memories addressable through the memory fabric;
  the physical layer interface, operatively coupled to the memory access logic, operative to receive incoming packets addressed for the local memory of the second device from the first device through the memory fabric having a higher data rate than a data rate of the physical layer interface, at least some of the packets comprising different instruction types;
  a controller operatively coupled to the physical layer interface and configured to:
    determine a packet type of the incoming packets received from the memory fabric; and
    when the determined incoming packet type is of a type containing an atomic request queuing the incoming packet in a first priority buffer, queuing incoming packets determined to contain load requests in a second priority buffer having a lower priority than the first priority buffer, queueing incoming packets determined to contain store requests in a third priority buffer having a lower priority than the second priority buffer, prioritize transfer of the incoming packet with the atomic request over packets in the second and third priority buffers, to the memory access logic.

17. The system of claim 16, wherein:
the controller is further configured to queue incoming packets determined to contain store requests in the buffer, while providing the incoming packet with the atomic request to the memory access logic.

18. The system of claim 17, wherein the second device comprises:
configuration registers that are configured to include data that defines at least a plurality of memory regions of a local memory of the device as priority memory regions, wherein each memory region has a maximum unrestricted number of memory fabric accesses allowed per a time interval; and
wherein the controller is further configured to:
  maintain a count of a number of memory accesses that have been made to a defined memory region by the memory fabric over the time interval;
  store read packets in the second priority buffer when the maximum allowed number of accesses is exceeded; and
  provide the stored packets to the memory access logic from the second priority buffer in a next time interval.

19. The system of claim 18, wherein:
the second priority buffer comprises a plurality of second priority buffers, wherein each of the plurality of second priority buffers corresponds to a different defined memory region; and
the controller is further configured to store incoming packets of a type determined to contain a read request in respective second priority buffers that correspond to different defined memory regions based on an address associated with the incoming packet.

* * * * *